United States Patent
Seymour et al.

(10) Patent No.: US 6,293,091 B1
(45) Date of Patent: Sep. 25, 2001

(54) AXISYMMETRICAL ANNULAR PLUG PROPULSION SYSTEM FOR INTEGRATED ROCKET/RAMJET OR ROCKET/SCRAMJET

(75) Inventors: Nathanael F. Seymour, Dallas, TX (US); Kathleen F. Hodge, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/296,343

(22) Filed: Apr. 22, 1999

(51) Int. Cl.$^7$ .................................................... F02K 11/00
(52) U.S. Cl. ................................ 60/225; 60/230; 60/232; 60/245; 60/246; 60/250; 60/251; 60/270; 60/270.1
(58) Field of Search ..................... 60/270.1, 246, 60/251, 271, 230, 232, 225, 245, 250, 224

(56) References Cited

U.S. PATENT DOCUMENTS

| | | | |
|---|---|---|---|
| 3,901,028 | * 8/1975 | Leingang | 60/225 |
| 3,940,067 | 2/1976 | Cherry et al. | 239/265.1 |
| 4,028,886 | * 6/1977 | Hackett | 60/245 |
| 4,417,441 | * 11/1983 | Crispin et al. | 60/251 |
| 4,519,208 | 5/1985 | Loisy et al. | 60/262 |
| 5,067,316 | 11/1991 | Bonniot | 60/263 |
| 5,078,336 | 1/1992 | Carter | 244/322 |
| 5,119,626 | 6/1992 | Lardellier | 60/244 |
| 5,419,120 | 5/1995 | Donguy | 60/253 |
| 5,524,827 | 6/1996 | Znamensky et al. | 239/265.1 |
| 5,690,280 | * 11/1997 | Holowach et al. | 239/265.25 |
| 6,003,302 | * 12/1999 | Feldman | 60/270.1 |

OTHER PUBLICATIONS

*Mechanics and Thermodynamics of Propulsion*, by Hill & Peterson, 1954, pp. 413–415.
AIAA 96–3040, 32nd AIAA/ASME/SAE/ASEE Joint Propulsion Conference, Jul. 1–3, 1966, Lake Buena Vista, Florida, pp. 1–17.
AIAA 93–1944, 29th Joint Propulsion Conference and Exhibit, Jun. 28–30, 1993, Monterey, CA, (27 pgs.).
Aerospike, ALS Engines by Rocketdyne, 2 pgs. (Pub. 571–M–87.6 New 6–88).
Linear Aerospike, ALS Engines by Rocketdyne, 2 pgs. (Pub. 571–M 87.5 New 6–88).
Aerospatiale, Space & Defense Air–to–ground missile, 1 pg., Copyright 1966.
Jane's Strategic Weapon Systems, vol. 23, Jan. 31, 1997, Updated, Defensive Weapons, Russia, entitled "SA–6 'Gainful" (9M9/9M336 Kub), (5 pgs.).
Jane's Air–Launched Weapons, vol. 25, Nov. 15, 1996, Air–to–Surface Missiles, France, entitled "ASMP" (4 pgs.).
Jane's Air–Launched Weapons, vol. 27, Jul. 17, 1997, Updated, Air–to–Air Missiles—Unclassified Projects, France, "ASMP–R" (1 pg.).
Jane's Air–Launched Weapons, vol. 25, Nov. 15, 1996, Air–to–Surface Missiles–Unclassified Projects, France, "ASMP–Plus" (1 pg.).

* cited by examiner

Primary Examiner—Timothy S. Thorpe
Assistant Examiner—Eric Hayes
(74) Attorney, Agent, or Firm—Connie M. Thousand

(57) ABSTRACT

The invention is an airframe which includes a vehicle (12) having a solid propellant rocket engine (14) and a ramjet or scramjet engine (16); a thrust plug (18) extending from an end (20) of the vehicle which directs combustion gases (23 and 64) produced by the solid propellant rocket engine or ramjet/scramjet engine to produce forward thrust; a longitudinal passage (38) extending from the end of the vehicle to an opening (30) forward of the end which receives external air directed by forward movement of the vehicle and in which solid propellant (32) of the solid propellant rocket engine is located, and wherein during rocket operation solid propellant is combusted to produce the combustion gases in the longitudinal passage which are conveyed by the longitudinal passage into contact with the thrust plug and during ramjet/scramjet operation the longitudinal passage is open to flow of external air after operation of the solid propellant rocket engine is completed and which supports mixing and combustion of the air/fuel by the ramjet/scramjet engine to produce combustion gases which are conveyed by the longitudinal passage into contact with the thrust plug.

40 Claims, 4 Drawing Sheets

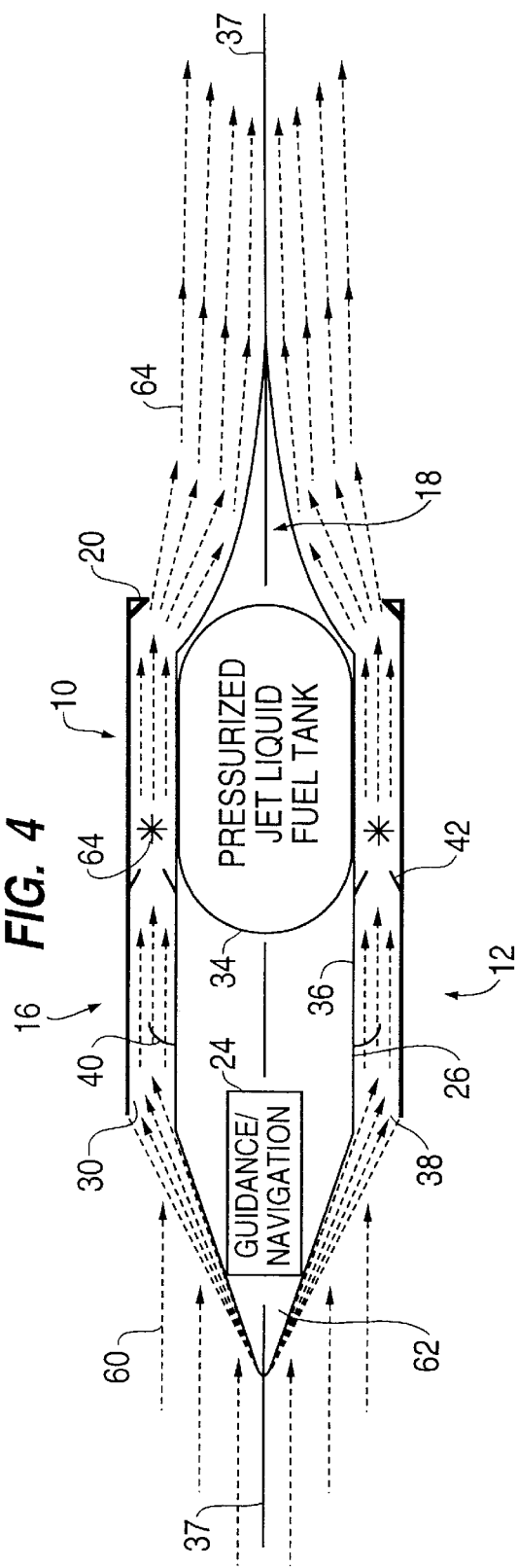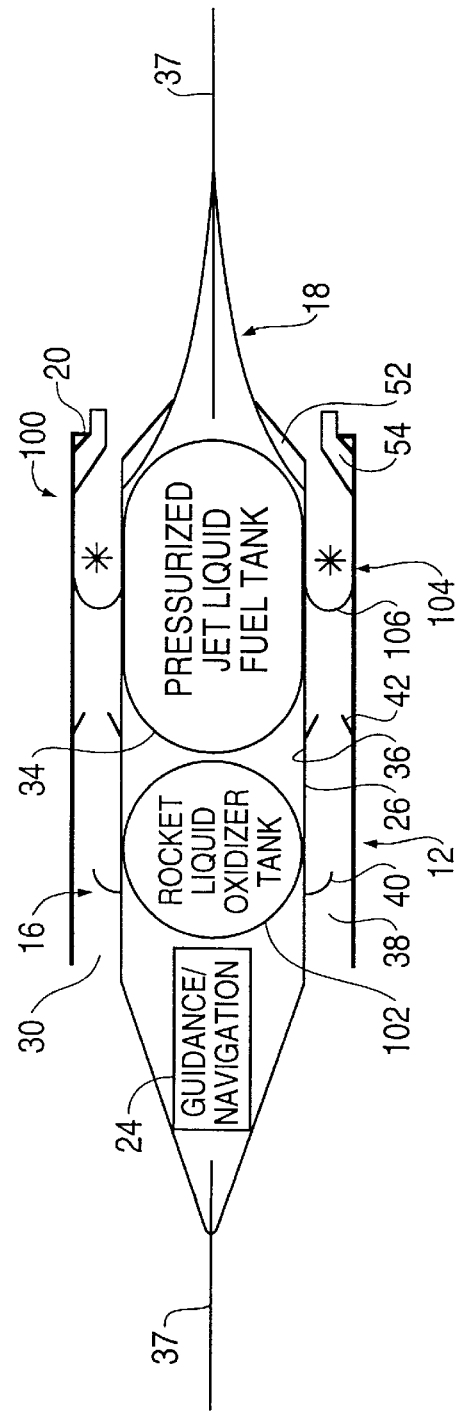

AXISYMMETRICAL ANNULAR PLUG PROPULSION SYSTEM FOR INTEGRATED ROCKET/RAMJET OR ROCKET/SCRAMJET

BACKGROUND OF THE INVENTION

1. Field of the Invention

The present invention relates to airframes having a combined rocket engine and ramjet or scramjet.

2. Description of the Prior Art

Ramjets provide fuel efficient propulsion of airframes at high Mach numbers. A ramjet operates under locally subsonic combustion conditions while a scramjet or supersonic combustion ramjet, operates under locally supersonic combustion conditions. To date, ramjets are in use and scramjets are currently under design but not yet field deployed. The current state of the art of scramjet technology involves ground testing in high speed wind tunnels and certain flight articles have been flown on forebodies of missiles and research airplanes. Scramjets were proposed on the X-30 high speed propulsion system but this program was cancelled before the technology was taken to fruition.

A need exists for an inexpensive high speed cruise type airframe having a fixed geometry which does not eject objects, such as staging that could injure civilians in the flight path, having a long operation range such as between 400–700 nautical miles. In order to successfully operate a ramjet engine in this environment, it is necessary to boost its speed to takeover velocities, about Mach 2 or greater, where the liquid fueled ramjet engine can operate efficiently and propel the missile for the remainder of the flight. A scramjet, or supersonic combustion ramjet, typically operates at speeds above Mach 6. Like a ramjet it requires another means to accelerate itself to operational speeds.

Chemical rocket engines provide the simplest mechanism for accelerating a platform up to takeover velocity but suffer from the deficiency of being space inefficient as a consequence of the necessity to carry oxidizer. The oxidizer is the majority of the propellant mass in a rocket-based missile which can reduce its effective range by factors between three to six times compared to ramjet engines which burn atmospheric air.

Plug nozzles were developed in the 1970's. A plug nozzle has a plume which is shaped by the external atmospheric air.

Two missile systems have been developed which utilized a solid rocket engine mounted within the combustion chamber of a ramjet. The first missile system is the French ASMP (AirSol-Moyenne-Portee') medium range air to ground missile having a range of 250 km. and a maximum speed of about Mach 3.0. The second missile is the Russian SA-6 Gainful ground to air missile which has a range of 60 km., at an altitude of 18 km. and a maximum speed of about Mach 2.8.

The U.S. Navy's Talos surface to air system, which is no longer in service, utilizes a separate rocket booster motor in conjunction with a ramjet.

SUMMARY OF THE INVENTION

The present invention is an improved airframe which contains a rocket engine, which may use either solid or liquid propellant, that is nested in the longitudinally extending air passages of an axisymmetric ramjet or scramjet engine. The rocket engine quickly boosts the airframe up to takeover velocity of the ramjet or scramjet engine at which fuel efficient ramjet or scramjet operation is produced for long ranges such as 400 to 700 Nmi. The rocket engine is cleared from the longitudinal extending air passages of the jet engine to permit full ingress and passage of external air to the ramjet or scramjet combustion chamber. The chemical rocket engine is disposed in an annular cross section of the longitudinally extending passages symmetrical about the longitudinal axis of the airframe which provides efficient space utilization.

The plug nozzle provides automatic compensation for changes in external pressure which permits launching from underwater, ground level or from aircraft while providing high propulsion performance. Additionally, the plug nozzle is equally efficient at producing thrust for rocket and ramjet/scramjet operation across the altitude range.

The invention has application for high speed missiles or the first stage of a space launch vehicle. Furthermore, operation across multiple platforms and multiple operating conditions may be achieved.

The longitudinal passage is located between an outer cylindrical wall and inner cylindrical wall of the vehicle; and a liquid fuel tank having an outer cylindrical surface is inside an inner surface of the inner cylindrical wall so that the pressurized liquid propellant tank resists compressive force produced by combustion by the solid or liquid propellant rocket engine. An inner ablative material is positioned adjacent an outer surface of the thrust plug. An outer ablative material is positioned adjacent the end and spaced from the inner ablative material to define an annular exit opening through which combustion gas is passed from the solid or liquid propellant rocket. The thrust plug is pivotable relative to a longitudinal axis of the airframe to direct thrust relative to the longitudinal axis to provide direction control. Fuel injectors for the ramjet or scramjet are disposed in the longitudinal passage forward of the solid or liquid propellant rocket engine and flame holders are disposed in the longitudinal passage forward of the solid fuel rocket engine and to the rear of the fuel injectors. The solid fuel or liquid propellant rocket engine has a bulkhead which faces forward, is frangible and shatters upon ending of operation of the solid fuel rocket engine to clear the longitudinal passage to the flow of external air. An explosive may be disposed in the forward bulkhead for shattering the forward bulkhead upon ending of operation of the solid or liquid propellant rocket.

BRIEF DESCRIPTION OF THE DRAWINGS

FIG. 4 illustrates the operation of the present invention during ramjet or scramjet operation after the longitudinal passage has been cleared of solid propellant.

FIG. 5 illustrates an alternative embodiment of the present invention utilizing a liquid propellant rocket.

DETAILED DESCRIPTION OF THE INVENTION

Figure 1:
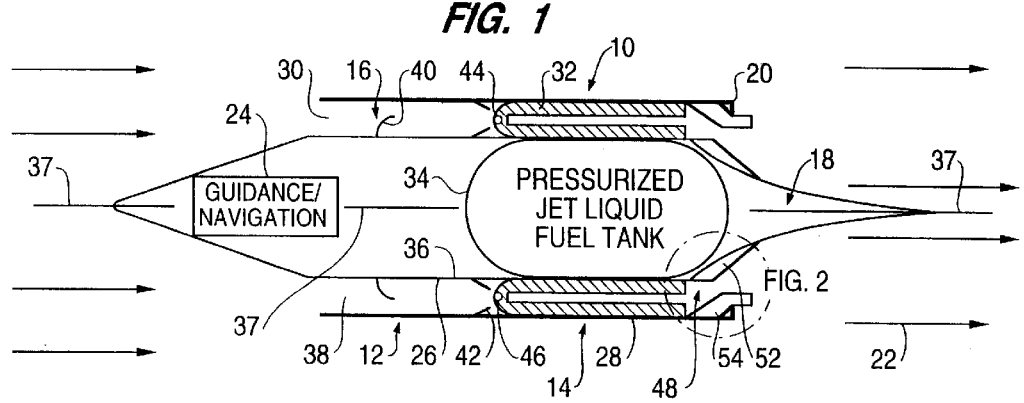
FIG. 1 illustrates a first embodiment of the present invention which utilizes a solid propellant rocket engine within the annular, longitudinally extending ramjet/scramjet air passage of the airframe.

FIG. 1 illustrates a first embodiment of vehicle 10 in accordance with the present invention. The vehicle 10 is comprised of a a cylindrical body which contains a solid propellant rocket engine 14 and either a ramjet or scramjet engine 12. The solid propellant rocket engine 14 and ramjet/scramjet 12 may be in accordance with any known design. A thrust plug 18 of known design extends from an end 20 of the vehicle 10 which directs combustion gases produced by the solid propellant rocket or ramjet/scramjet to produce forward thrust. The thrust plug 18 contributes to the overall efficiency of operation of the vehicle 10 as a consequence of it efficiently developing thrust for both rocket and ramjet/scramjet operation. The vehicle 10 contains a guidance/navigation system 24 which is designed for the function of the vehicle which may be utilized as a high speed missile or a first stage of a launch vehicle. The vehicle 10 contains an inner cylindrical wall 26 which is the inner wall of the solid propellant rocket engine 14 and an outer cylindrical wall 28 which is the outer wall of the solid propellant rocket engine. Structural members spaced about the circumference of the vehicle 10 attach the inner cylindrical wall 26 and the outer cylindrical wall 28 together (not illustrated). The spacing between the inner cylindrical chamber 26 and outer cylindrical wall 28 defines longitudinal air passages 38 having an annular cross section extending from the end 20 of the airframe to an opening 30 which receives external air produced by forward movement in a direction opposite to arrows 22 indicating air flow past of the airframe and in which solid propellant 32 is located prior to activation of the solid propellant rocket engine. A pressurized ramjet liquid fuel tank 34 is disposed inside of the inner cylindrical wall 26 in surface contact with the outer surface 36 of the inner cylindrical wall 26. The radial outward force produced by the pressurized liquid fuel tank 34 resists the radial inward compressive force produced by activation of the solid propellant rocket engine 14 so that these forces are substantially equal and opposite which permits the cylindrical wall 26 to be thinner than it would be if the pressurized liquid fuel tank did not resist the radial inward combustive forces.

The overall cross section of the vehicle 10 is symmetrical about the longitudinally extending center axis 37. The annular geometry of the longitudinally extending passage 38, which contains the solid propellant rocket engine 14, is a highly efficient space utilization for the boost phase produced by the activation of the solid propellant rocket engine 14. The ramjet/scramjet 12 contains a fuel injection system 40 of conventional design and flame holders 42 which are located in front of the solid propellant rocket engine 14. The solid propellant rocket engine 14 may contain a dome shape metallic bulkhead 44 located at the front thereof. The design of the solid propellant rocket engine 14 and ramjet/scramjet 12 is conventional and does not form part of the present invention. The dome-shaped metallic bulkhead 44 of the solid propellant rocket engine 14 may contain detonating cord 46 to shatter the metallic bulkhead to provide clearance of the solid propellant rocket engine 14 from the longitudinal passage 38 at the end of the rocket burn to permit the ingress and flow of external air. In another incarnation of the invention the shattered forward bulkhead may act as a flameholder 42. Alternately, the flameholder 42 may act as a support for the metallic bulkhead 44. During rocket operation, the solid propellant 32 is combusted to produce the combustion gases in the longitudinal passage which are conveyed by the longitudinal passage into contact with the thrust plug 18. Upon burn out of the solid propellant 32, the external stagnation pressure is greater than the internal pressure which causes the dome-shaped forward bulkhead 44 to reverse and shatter to clear the ramjet/scramjet combustor. Alternatively, linear detonating cord 46 is detonated to shatter the forward bulkhead 44.

Figure 2:
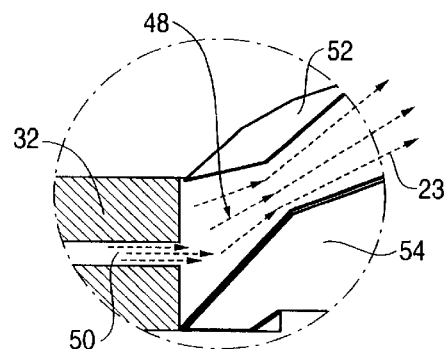
FIG. 2 is an enlarged view of the exit of the annular longitudinal air passage defined by ablative materials used during rocket operation for conveying gases into contact with the thrust plug located at the end of the airframe body.

FIG. 2 illustrates an enlargement of the solid motor combustion chamber 48 from which combustion gases are discharged by the solid propellant rocket engine 14. As illustrated, the gases 50 exit from an annular passage located between the inner and outer cylindrical boundaries of the solid propellant 32. The discharge gases 50 contact an inner nozzle material 52 and an outer nozzle material 54 which are of conventional design and may be implemented with numerous different well-known materials which do not form part of the present invention. Both the inner nozzle material 52 and the outer nozzle material 54 are composed of a rapid-ablating material covered with a slow-ablating material. The slow-ablating material serves to protect the nozzle, 52 and 54, for the balance of the solid rocket motor 14 burn. Near the end of the solid rocket motor 14 burn, the thin layer of slow-ablating material is exhausted, exposing the rapid ablating material to the hot exhaust. This results in the rapid removal of 52 and 54 from the engine. Furthermore, this may be such that at the end of the solid propellant burn the materials 52 and 54 are completely ablated which opens the end 20 to the discharge of combustion gases produced by the ramjet/scramjet 12 as described below.

Figure 3:
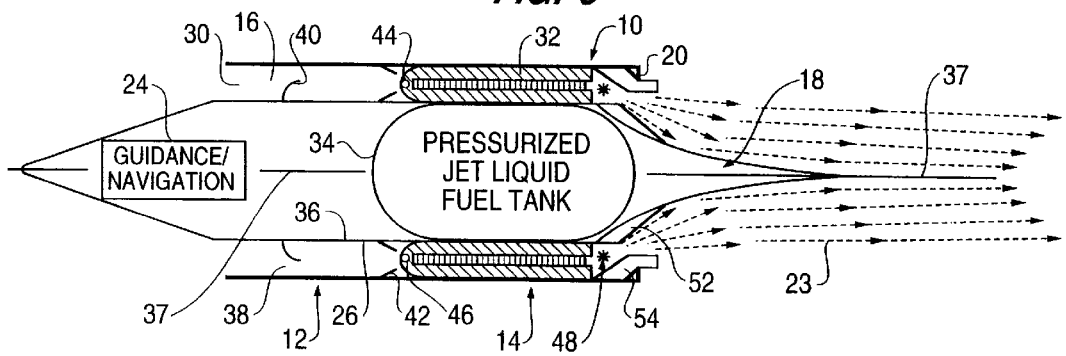
FIG. 3 illustrates the operation of the first embodiment of the invention during solid propellant rocket operation.

FIG. 3 illustrates the operation of the present invention during activation of the solid propellant rocket engine 14 to produce a large volume of combustion gases 22 which produce high thrust to accelerate the vehicle 10 up to speeds sufficient for ramjet/scramjet takeover. During solid propellant rocket engine operation, the solid propellant 32 is rapidly combusted to accelerate the air frame to takeover velocities of about Mach 2.

FIG. 4 illustrates the operation of the present invention during activation of the ramjet/scramjet 12. As illustrated, the vehicle 12 is moving at speeds of about Mach 2 or greater in a forward direction which intercepts atmospheric air 60 which is directed by the inlet cone 62 of the vehicle 10 into the inlet 30 to provide high pressure air to be mixed and combusted with liquid fuel injected from the pressurized liquid fuel tank 34 at a point of combustion 64 located behind the flame holder 42 to produce high thrust to sustain vehicle operation over long distances, such as 400 to 700 nautical miles. As is apparent from FIG. 4, the ablative materials 52 and 54 have been cleared from the end 20 which directs the combustion gases 64 into contact with the thrust plug 18 to produce thrust.

The outer structural annular cowling defining the outer cylindrical wall 28 may be efficiently designed to withstand tension loads during the solid propellant rocket engine burn. The inner cylindrical wall 26 may be designed to withstand the resultant compressive loads caused by rocket operation by using the additional structural rigidity of pressurized liquid fuel tank 34. The pressurized liquid fuel tank 34 resists the compressive force produced by rocket operation which lessens the structural requirements of the inner cylindrical wall 26 which otherwise would be required to resist the compressive force produced by rocket operation. As a result, the internal pressurization of the liquid fuel tank 34 acts against the radially inward compressive pressurization of the solid propellant rocket engine 14 which reduces or eliminates compressive loads on the inner cylindrical wall 26. The opening 30 may have a variable geometry which is used to eliminate spillage and increase performance. Furthermore, during scramjet operation, external burning may occur.

FIG. 5 illustrates a second embodiment 100 of the present invention which differs from the first embodiment 10 by using a liquid propellant rocket engine 104 in place of the solid propellant rocket engine 14 of the first embodiment. A pressurized liquid oxidizer tank 102 is located in front of the pressurized liquid fuel tank 34 for providing oxidizer to the liquid propellant rocket 104 which is of conventional design. The liquid propellant rocket engine 104 has a forward bulkhead 106 which is either expendable or retractable. The bulkhead 106 may be frangible and shatter in response to the force of external air entering the opening 30 of the longitudinal passage 38 after liquid rocket engine burn is complete or alternatively, may be removed by an explosive device, such as detonating cord (not illustrated). Alternatively, the forward bulkhead 106 may be retracted into the inner cylindrical chamber 26 by a suitable mechanism (not illustrated).

The operation of the embodiment 100 of FIG. 5 is similar to that of the embodiment of FIG. 1 in that rocket operation is used to boost the vehicle 12 to velocities of Mach 2 or above sufficient for ramjet/scramjet takeover, at which time the longitudinal passage 38 is cleared and activation of the ramjet/scramjet 12 occurs. The second embodiment shares the efficient space utilization of the first embodiment.

Figure 6:
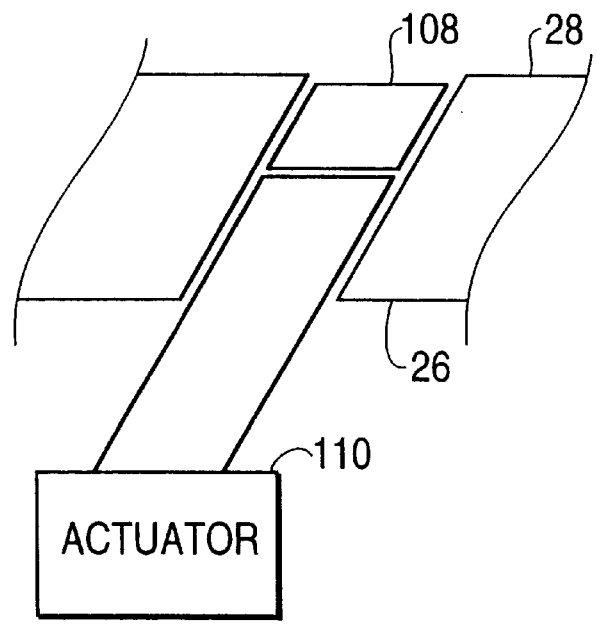
FIGS. 6 and 7 illustrate respectively control surfaces which are initially located inside of the outer cylindrical wall of the airframe but are deployable to extended positions to provide directional control. Said control surfaces are deployed from within the structural members that separate the inner and outer cylinders of the engine.
Figure 7:
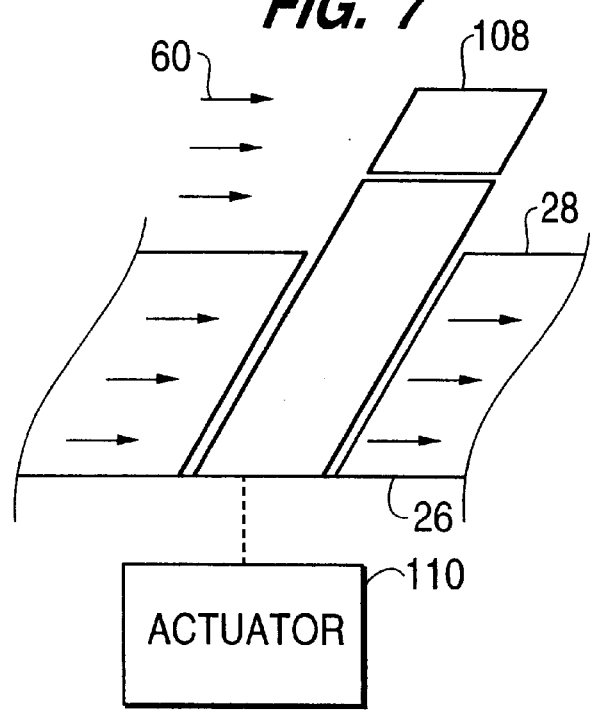

FIGS. 6 and 7 illustrate the non-deployed and deployed states respectively of control surfaces 108 which are positioned by an actuator 110 of conventional design. As illustrated in FIG. 6, the control surfaces 106 are deployed within the outer cylindrical wall 28 of the vehicle 12 which is their normal position prior to launch and, as illustrated in FIG. 7, the control surfaces 108 are positioned outward of the outer cylindrical wall 28 to provide flight direction control in accordance with well-known principles which do not form part of the present invention.

Struts (not illustrated) may be used to attach the outer cylindrical wall cowling 28 to the inner cylindrical wall 26. These struts may be hollow and may contain the deployable control surfaces 108, allowing deployment of said surfaces from within the vehicle 10 after launching.

Figure 8:
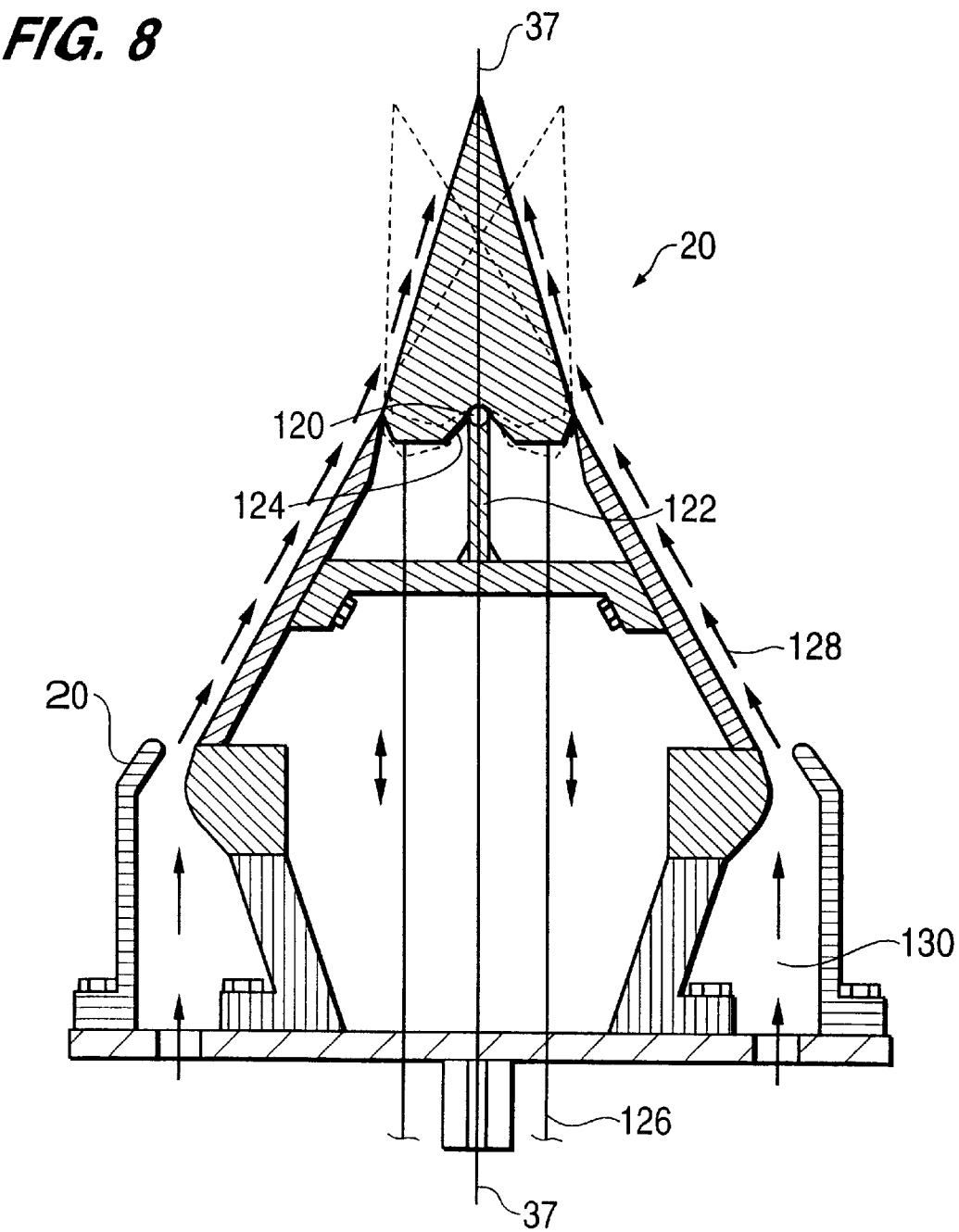
FIG. 8 illustrates a mechanism for pivoting the thrust plug relative to the longitudinal axis of the vehicle to provide directional control.

FIG. 8 illustrates a mechanism for testing the pivoting of the thrust plug 20 relative to the longitudinal axis 37 to provide direction control of the vehicle 10. A ball pivoting point 120 is positioned in a center member 122 which engages an inner conical surface 124 of the thrust plug 18 to permit its relative movement with respect to the longitudinal axis 37. Gasses 128 flow from the high pressure within the plenum 130 and are directed along the conically-shaped plug 18 to produce thrust. As illustrated in solid lines, the thrust plug 18 is centered about the longitudinal axis 37. As illustrated in phantom lines, thrust plug 18 may be positioned in an orientation which is not centered about the longitudinal axis 37 by movement of the control members 126 which may be wires or other structures which are moved to cause the pivoting of the thrust plug 18 from its centered solid line position to the phantom positions as illustrated by dotted lines. The pivoting of the thrust plug 18 is under the control of the guidance and navigation system 24. The pivoting of the thrust plug 18 relative to the longitudinal axis 37 directs thrust relative to the longitudinal axis.

The present invention has substantial advantages over the prior art. The combination of rocket engine boost and ramjet/scramjet engine operation provides long range fuel efficiency. High volumetric efficiency is provided by the placement of a solid or liquid propellant rocket engine 14 or 104 within the normal hollow volume of the longitudinal air inlet passage 38 of the ramjet/scramjet 12. Additionally, the use of the thrust plug 18 automatically compensates for changes in external pressure which permits launching from a submarine, ground level or aircraft, with high propulsion system performance. This increased performance is achieved across the aforementioned altitude range for both rocket and ramjet/scramjet operation mode. Furthermore, operation on a ramjet or scramjet principle is much more fuel efficient than rocket operation (three to six times) which results in a smaller vehicle body and an increased range.

While the invention has been described in terms of its embodiments, it should be understood that numerous modifications may be made thereto without departing from the spirit and scope of the present invention. It is intended that all such modifications fall within the scope of the appended claims.

What is claimed is:

1. An airframe comprising:
   a vehicle having a solid propellant rocket engine and one of a ramjet or a scramjet engine;
   a thrust plug extending from an end of the vehicle which directs combustion gases produced by the solid propellant rocket engine or ramjet/scramjet engine to produce forward thrust;
   a longitudinal passage extending from the end of the vehicle to an opening forward of the end which receives external air directed by forward movement of the airframe and in which solid fuel propellant of the solid propellant rocket engine is located; and wherein during rocket engine operation solid propellant is combusted to produce the combustion gases in the longitudinal combustion chamber which are conveyed by the inner and outer ablative material into contact with the thrust plug and during ramjet/scramjet operation, the longitudinal passage is open to flow of external air after operation of the solid propellant rocket engine is completed and which supports combustion of fuel by the ramjet/scramjet engine to produce combustion gases which are conveyed by the longitudinal passage into contact with the thrust plug.

2. An airframe in accordance with claim 1 wherein:
   the longitudinal passage is symmetrical in a cross-section about a longitudinal axis of the vehicle.

3. An airframe in accordance with claim 2 wherein:
   the cross section of the longitudinal passage is annular.

4. An airframe in accordance with claim 1 wherein:
   the longitudinal passage is located between an outer cylindrical wall and an inner cylindrical wall of the vehicle; and
   a pressurized liquid fuel tank having an outer cylindrical surface is inside an inner surface of the inner cylindrical wall with the liquid fuel tank resisting compressive force produced by combustion of the solid propellant by the solid propellant rocket engine.

5. An airframe in accordance with claim 2 wherein:
   the longitudinal passage is located between an outer cylindrical wall and an inner cylindrical wall of the vehicle; and
   a liquid fuel tank having an outer cylindrical surface is inside an inner surface of the inner cylindrical wall with the pressurized liquid fuel tank resisting compressive force produced by combustion of the solid propellant by the solid propellant rocket engine.

6. An airframe in accordance with claim 3 wherein:
the longitudinal passage is located between an outer cylindrical wall and an inner cylindrical wall of the vehicle; and
a pressurized liquid fuel tank having an outer cylindrical surface is inside an inner surface of the inner cylindrical wall with the pressurized liquid fuel tank resisting compressive force produced by combustion of the solid propellant by the solid propellant rocket engine.

7. An airframe in accordance with claim 1 further comprising.
an inner ablative material positioned adjacent an outer surface of the trust plug; and
an outer ablative material covering the inner ablative material; and wherein
the outer ablative material has a rate of ablation lower than a rate of ablation of the inner annular ablative material and the solid propellant rocket engine and the ramjet or scramjet engine are synmmetrical about a longitudinal axis of the vehicle.

8. An airframe in accordance with claim 4 further comprising:
an inner annular ablative material positioned adjacent an outer surface of the thrust plug; and
an outer annular ablative material covering the inner ablative material; and wherein
the outer annular ablative material has a rate of ablation lower than a rate of ablation of the inner annular ablative material and the solid propellant rocket engine and ramjet or scramjet engines are symmetrical about a longitudinal axis of the vehicle.

9. An airframe in accordance with claim 1 wherein:
the thrust plug is pivotable relative to a longitudinal axis of the airframe to direct thrust relative to the longitudinal axis.

10. An airframe in accordance with claim 4 wherein:
the thrust plug is pivotable relative to a longitudinal axis of the airframe to direct thrust relative to the longitudinal axis.

11. An airframe in accordance with claim 7 wherein:
the thrust plug is pivotable relative to a longitudinal axis of the airframe to direct thrust relative to the longitudinal axis.

12. An airframe in accordance with claim 1 wherein the ramjet or scramjet engine comprises:
fuel injectors disposed in the longitudinal passage forward of the solid propellant rocket engine; and
flame holders disposed in the longitudinal passage forward of the solid propellant rocket engine and to a rear of the fuel injectors.

13. An airframe in accordance with claim 4 wherein the ramjet/scramjet engine comprises:
fuel injectors disposed in the longitudinal passage forward of the solid propellant rocket engine; and
flame holders disposed in the longitudinal passage forward of the solid propellant rocket engine and to a rear of the fuel injectors.

14. An airframe in accordance with claim 7 wherein the ramjet or scramjet engine comprises:
fuel injectors disposed in the longitudinal passage forward of the solid propellant rocket engine; and
flame holders disposed in the longitudinal passage forward of the solid propellant rocket engine and to a rear of the fuel injectors.

15. An airframe in accordance with claim 9 wherein the ramjet or scramjet engine comprises:
fuel injectors disposed in the longitudinal passage forward of the solid propellant rocket engine; and
flame holders disposed in the longitudinal passage forward of the solid propellant rocket engine and to a rear of the fuel injectors.

16. An airframe in accordance with claim 1 wherein:
the solid propellant rocket engine has a bulkhead facing forward which is frangible and shatters upon ending of operation of the solid propellant rocket engine to clear the longitudinal passage to the flow of external air.

17. An airframe in accordance with claim 16 further comprising:
an explosive disposed in the forward bulkhead for shattering the forward bulkhead upon ending of operation of the solid propellant rocket engine.

18. An airframe in accordance with claim 4 wherein:
the solid propellant rocket engine has a bulkhead facing forward which is frangible and shatters upon ending of operation of the solid propellant rocket engine to clear the longitudinal passage to the flow of external air.

19. An airframe in accordance with claim 18 further comprising:
an explosive disposed in the forward bulkhead for shattering the forward bulkhead upon ending of operation of the solid propellant rocket engine.

20. An airframe in accordance with claim 7 wherein:
the solid propellant rocket engine has a bulkhead facing forward which is frangible and shatters upon ending of operation of the solid propellant rocket engine to clear the longitudinal passage to the flow of external air.

21. An airframe in accordance with claim 20 further comprising:
an explosive disposed in the forward bulkhead for shattering the forward bulkhead upon ending of operation of the solid propellant rocket engine.

22. An airframe in accordance with claim 9 wherein:
the solid propellant rocket engine has a bulkhead facing forward which is frangible and shatters upon ending of operation of the solid propellant rocket engine to clear the longitudinal passage to the flow of external air.

23. An airframe in accordance with claim 22 further comprising:
an explosive disposed in the forward bulkhead for shattering the forward bulkhead upon ending of operation of the solid propellant rocket engine.

24. An airframe in accordance with claim 12 wherein:
the solid propellant rocket engine has a bulkhead facing forward which is frangible and shatters upon ending of operation of the solid propellant rocket engine to clear the longitudinal passage to the flow of external air.

25. An airframe in accordance with claim 24 further comprising:
an explosive disposed in the forward bulkhead for shattering the forward bulkhead upon ending of operation of the solid propellant rocket engine.

26. An airframe comprising:
a vehicle having a rocket engine and a ramjet engine;
a thrust plug extending from an end of the vehicle which directs combustion gases produced by the rocket engine or ramjet engine; and
a longitudinal passage extending from the end of the vehicle to an opening forward of the end which receives external air directed by forward movement of the vehicle, in which is located the rocket engine and which has a cross section orthogonal to a longitudinal axis of the vehicle which is symmetrical relative to a longitudinal axis; and wherein during rocket engine operation, propellant is combusted to produce combustion gases in the longitudinal passage which are conveyed by the longitudinal passage into contact with the thrust plug and during ramjet operation, which is open to flow of external air after operation of the rocket engine is completed and which supports mixing and combustion of air/fuel by the ramjet engine to produce combustion gases which are conveyed by the longitudinal passage into contact with the thrust plug.

27. An airframe in accordance with claim 26 wherein:

the rocket engine is a liquid propellant rocket engine; and the liquid propellant rocket engine has a bulkhead which faces forward relative to a direction of motion of the vehicle which is either retractable or frangible.

28. An airframe in accordance with claim 27 wherein:

the longitudinal passage has an annular cross section disposed between an outer cylindrical wall and an inner cylindrical wall of the vehicle; and a pressurized liquid fuel tank for storing fuel having an outer cylindrical surface is disposed in surface contact with an inner surface of the inner cylindrical wall with the pressurized liquid fuel tank resisting compression force produced by combustion produced by the rocket engine.

29. An airframe in accordance with claim 28 wherein:

a liquid oxidizer tank is disposed inside of the inner cylindrical wall for storing liquid oxidizer for the liquid propellant rocket engine.

30. An airframe in accordance with claim 26 further comprising:

an inner annular ablative material positioned adjacent an outer surface of the thrust plug; and an outer annular ablative material covering the inner ablative material; and wherein the outer annular ablative material has a rate of ablation lower than a rate of ablation of the inner annular ablative material and the rocket engine and scramjet engine are symmetrical about a longitudinal axis of the vehicle.

31. An airframe in accordance with claim 26 wherein:

the thrust plug is pivotable relative to a longitudinal axis of the vehicle to direct thrust relative to the longitudinal axis.

32. An airframe in accordance with claim 27 wherein:

the thrust plug is pivotable relative to a longitudinal axis of the vehicle to direct thrust relative to the longitudinal axis.

33. An airframe in accordance with claim 28 wherein:

the thrust plug is pivotable relative to a longitudinal axis of the vehicle to direct thrust relative to the longitudinal axis.

34. An airframe in accordance with claim 29 wherein:

the thrust plug is pivotable relative to a longitudinal axis of the vehicle to direct thrust relative to the longitudinal axis.

35. An airframe comprising:

a vehicle having a rocket engine and a scramjet engine;

a thrust plug extending from an end of the vehicle which directs combustion gases produced by the rocket engine or scramjet engine; and a longitudinal passage extending from the end of the vehicle to an opening forward of the end which receives external air directed by forward movement of the vehicle, in which is located the rocket engine and which has a cross section orthogonal to a longitudinal axis of the vehicle which is symmetrical relative to a longitudinal axis; and wherein during rocket engine operation, propellant is combusted to produce the combustion gases in the longitudinal passage which arc conveyed by the longitudinal passage into contact with the thrust plug and during scramjet engine operation, which is open to flow of external air after operation of the rocket engine is completed and which supports mixing and combustion of air/fuel by the scramjet engine to produce combustion gases which are conveyed by the longitudinal passage into contact with the thrust plug.

36. An airframe in accordance with claim 35 wherein:

the rocket engine is a liquid propellant rocket engine; and the liquid propellant rocket engine has a bulkhead which faces forward relative to a direction of motion of the vehicle which is either retractable or frangible.

37. An airframe in accordance with claim 36 wherein:

the longitudinal passage has an annular cross section disposed between an outer cylindrical wall and an inner cylindrical wall of the vehicle; and a pressurized liquid fuel tank for storing fuel having an outer cylindrical surface is disposed in surface contact with an inner surface of the inner cylindrical wall with the pressurized liquid fuel tank resisting compression force produced by combustion produced by the rocket engine.

38. An airframe in accordance with claim 37 wherein:

a liquid oxidizer tank is disposed inside of the inner cylindrical wall for storing liquid oxidizer for the liquid propellant rocket engine.

39. An airframe in accordance with claim 35 further comprising:

an inner annular ablative material positioned adjacent an outer surface of the thrust plug; and an outer ablative material covering the inner ablative material; and wherein the outer ablative material has a rate of ablation lower than a rate of ablation of the inner annular ablative material and the rocket engine and scramjet engine are symmetrical about a longitudinal axis of the vehicle.

40. An airframe in accordance with claim 35 wherein:

the thrust plug is pivotable relative to a longitudinal axis of the vehicle to direct thrust relative to the longitudinal axis.

* * * * *